United States Patent
Luecke et al.

(10) Patent No.: US 6,671,090 B2
(45) Date of Patent: Dec. 30, 2003

(54) VISION ENHANCING OPTICAL SYSTEM

(75) Inventors: Francis S. Luecke, Crestwood, KY (US); Jaroslaw Pekar, Chapel Hill, NC (US); Henry A. Greene, Durham, NC (US)

(73) Assignee: Ocutech, Inc., Chapel Hill, NC (US)

(*) Notice: Subject to any disclaimer, the term of this patent is extended or adjusted under 35 U.S.C. 154(b) by 0 days.

(21) Appl. No.: 09/947,550

(22) Filed: Sep. 7, 2001

(65) Prior Publication Data

US 2003/0048531 A1 Mar. 13, 2003

(51) Int. Cl.[7] ............................................. G02B 23/00
(52) U.S. Cl. ........................ 359/410; 359/482; 351/158
(58) Field of Search ................................. 359/407, 409, 359/410, 411, 431, 480, 481, 482, 554, 555, 556, 835, 836; 351/158

(56) References Cited

U.S. PATENT DOCUMENTS

| | | | | |
|---|---|---|---|---|
| 3,437,396 A | * | 4/1969 | Humphrey | 359/556 |
| 3,437,397 A | * | 4/1969 | Humphrey | 359/556 |
| 3,468,595 A | * | 9/1969 | Humphrey | 359/556 |
| 3,608,996 A | * | 9/1971 | Humphrey | 359/556 |
| 3,645,602 A | * | 2/1972 | Clave et al. | 359/421 |
| 4,196,966 A | * | 4/1980 | Malis | 359/482 |
| 4,626,081 A | * | 12/1986 | Nishizawa | 359/407 |
| 4,704,000 A | | 11/1987 | Pekar et al. | |
| 5,321,547 A | * | 6/1994 | Zapp | 359/431 |
| 5,680,195 A | | 10/1997 | Pekar et al. | |
| 6,002,517 A | * | 12/1999 | Elkind | 359/409 |
| 6,065,835 A | | 5/2000 | Pekar et al. | |

OTHER PUBLICATIONS

Goldberg, Lee, "Self–Focusing Infrared Telescopic Glasses May Restore Sight to Millions", Electronic Design, Apr. 14, 1997, 2 pgs.

* cited by examiner

Primary Examiner—Mark A. Robinson
(74) Attorney, Agent, or Firm—Nixon & Vanderhye P.C.

(57) ABSTRACT

An optical system is capable of enhancing vision of low vision individuals using a simple adjustment mechanism that requires a minimum length of travel to effect a desired adjustment. First and second substantially perpendicular mirrors are mounted in a cluster for pivotable movement. An entrance mirror is pivoted in response to pivoting movement of the mirror cluster so as to ensure proper convergence when the object to be viewed is close to the objective lens or lenses in a binocular system. The system also includes an objective lens and an eyepiece lens and is readily mounted to a conventional eyeglasses frame.

21 Claims, 7 Drawing Sheets

VISION ENHANCING OPTICAL SYSTEM

STATEMENT REGARDING FEDERALLY SPONSORED RESEARCH OR DEVELOPMENT

This invention was made with Government support under SBIR Grant 5R44EY09322-03. The Government has certain rights in this invention.

CROSS-REFERENCE TO RELATED APPLICATIONS (NOT APPLICABLE)

BACKGROUND OF THE INVENTION

The present invention relates to vision enhancing optical systems and, more particularly, to a lightweight efficiently focusable optical system, especially for use by low vision persons such as in association with eyeglasses.

Vision enhancing systems for low vision individuals have made significant advances in the past years. As shown by U.S. Pat. Nos. 4,704,000 and 5,680,195, vision enhancing systems now may be provided that are light enough to be mounted on a user's eyeglasses. As shown in an article entitled "Self-Focusing Infrared Telescope Glasses May Restore Sight to Millions," *Electronic Design*, Goldberg, Apr. 14, 1997, such low vision systems may include auto-focusing. While enormous strides have been made, it is desirable to provide an optical system for low vision individuals that is even lighter and has more effective and efficient focusing and that is well suited for auto-focusing.

One system that attempts to achieve this object is described in U.S. Pat. No. 6,065,835, which is incorporated herein by reference. In this system, a mirror cluster includes two mirrors that are mounted at an angle of about 90° to each other and for substantially linear movement. With the 90° mirror cluster, two units of focus are achieved for every one unit of travel, making focusing quicker and easier. The patent recognizes that while the same basic results could be achieved by moving prisms instead of mirrors, mirrors are much lighter in weight than prisms and therefore are much more suitable to wearable vision systems, particularly those that must be light enough to be mounted on eyeglasses. This system, however, must be sized to accommodate the linear movement of the mirror cluster. In a binocular system, the linear movement of two mirror clusters must be accommodated. As a consequence, the size of the device is larger than desirable, and the device itself tends to interfere with normal and peripheral vision.

SUMMARY OF THE INVENTION

With the system of the present invention, it is an object to provide a lightweight, efficiently, universally and effectively focusable optical system, especially for use by low vision persons such as in association with eyeglasses. It is a further object to provide such a system within a compact housing that minimizes interference with central and peripheral vision.

It is yet another object to ensure that a magnified image viewed by the system at any distance appears in the same spatial location as normally viewed except for image size.

In an exemplary embodiment of the invention, a vision enhancing optical system includes an objective lens disposed in an optical path, an eyepiece lens disposed in the optical path, and a mirror cluster disposed in the optical path and having first and second substantially planar mirrors that are disposed at an angle of substantially 90° relative to each other. The mirror cluster is pivotable about an axis substantially perpendicular to the optical path at the mirror cluster. The system may further include a third mirror disposed in the optical path reflecting incoming light toward the objective lens. A fourth mirror may be disposed in the optical path reflecting the incoming light toward the mirror cluster. In sequence, the system preferably includes the third mirror reflecting incoming light toward the objective lens, the objective lens, the fourth mirror reflecting the incoming light toward the mirror cluster, the mirror cluster, and the eyepiece lens.

The first and second mirrors of the mirror cluster are preferably coupled to arms of a bracket disposed substantially 90° relative to each other. In this context, the bracket is coupled with a rotatable mirror arm. The system includes structure for rotating the mirror arms such as a motor or the like. The third mirror disposed in the optical path that reflects the incoming light toward the mirror cluster is also pivotable relative to the objective lens. In this context, the mirror arm supporting the third mirror preferably includes a cam, and the third mirror is coupled with a cam follower engaging the cam. The position of the third mirror is adjusted based on a position of the mirror arm.

The optical system may be a binocular or monocular system. In one embodiment of the monocular arrangement, an entrance mirror reflects incoming light toward the mirror cluster, wherein the entrance mirror is spaced from the mirror cluster by a distance substantially corresponding to the distance between a person's eyes. In a second embodiment, an entrance mirror reflects light toward a prism. In both embodiments, the entrance mirror is preferably pivotable relative to the optical path to enable image position correction as previously described.

In another embodiment, an eyepiece houses the eyepiece lens, and the optical system is attachable to a frame of a pair of glasses. When the optical system is attached to the glasses frame, only the eyepiece and eyepiece lens impinge an area inside the glasses frame.

In another exemplary embodiment of the invention, a binocular vision enhancing optical system includes first and second objective lenses disposed in first and second optical paths, respectively; first and second eyepiece lenses disposed in the first and second optical paths, respectively; and first and second mirror clusters disposed in the first and second optical paths, respectively. Each of the first and second mirror clusters includes first and second substantially planar mirrors that are disposed at an angle of substantially 90° relative to each other. The mirror clusters are pivotable about an axis substantially perpendicular to the respective optical paths at the mirror clusters.

In yet another exemplary embodiment of the invention, a vision enhancing optical system includes a pair of glasses including a frame and the vision enhancing unit according to the invention secured to the glasses frame.

BRIEF DESCRIPTION OF THE DRAWINGS

These and other aspects and advantages of the present invention will be described in detail with reference to the accompanying drawings, in which.

DETAILED DESCRIPTION OF PREFERRED EMBODIMENTS

Figure 1:
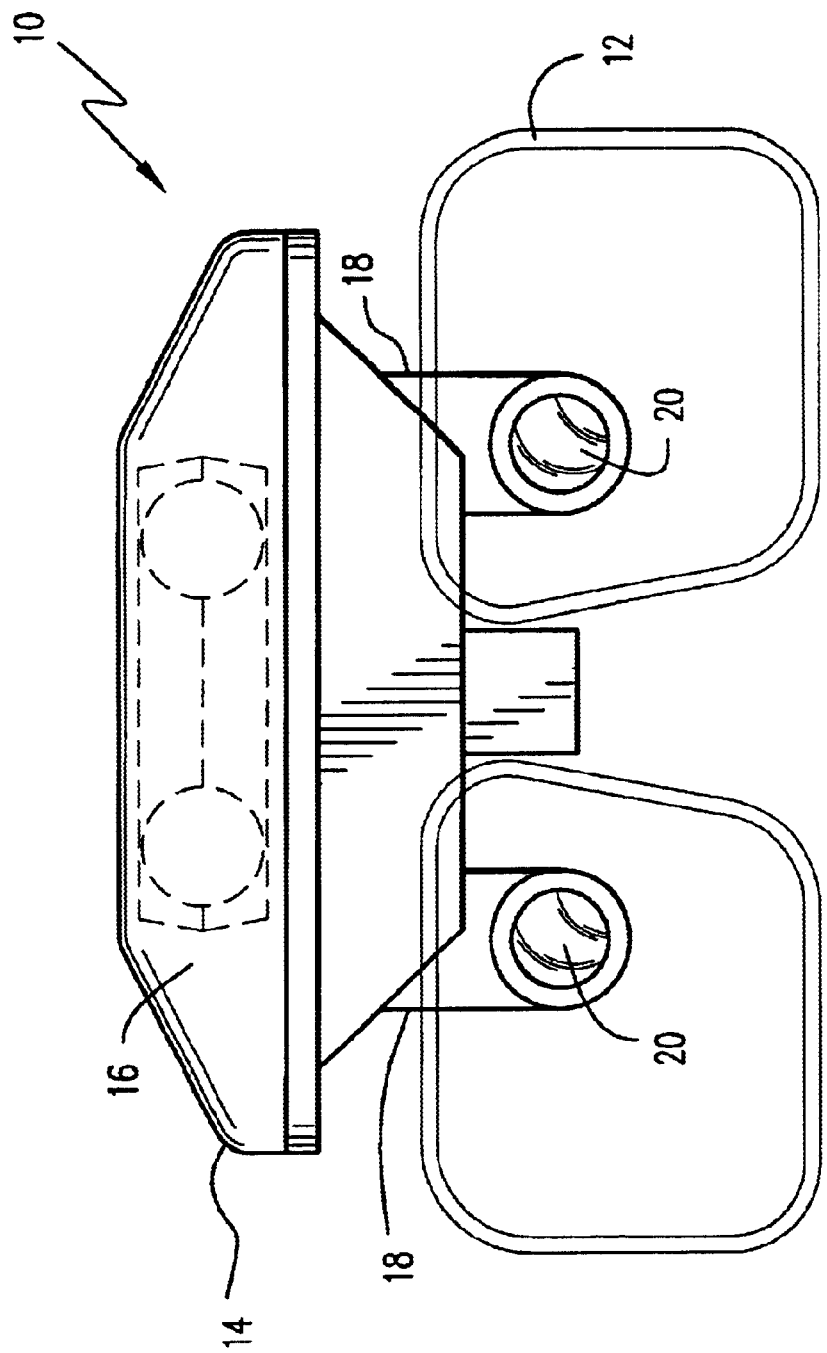
FIG. 1 shows the vision enhancing optical system according to the invention attached to a pair of eyeglasses.

FIG. 1 is a view from a user's perspective of the vision enhancing optical system 10 according to the present invention attached to the frame 12 of a pair of eyeglasses. Generally, the optical system 10 includes a main housing 14 containing or supporting the components of the optical system 10. An auto-focus component 16 and electronics therefor are contained within the main housing 14. The auto-focus component 16 and the electronics therefor are generally known and do not form part of the present invention. Further details thereof will thus not be described. Left and right eyepieces 18 house an eyepiece lens 20 and are configured to impinge an area inside the glasses frame 12 in front of a user's pupils. As seen in FIG. 1, only the eyepiece 18 and eyepiece lens 20 impinge the area inside the glasses frame 12.

Figure 2:
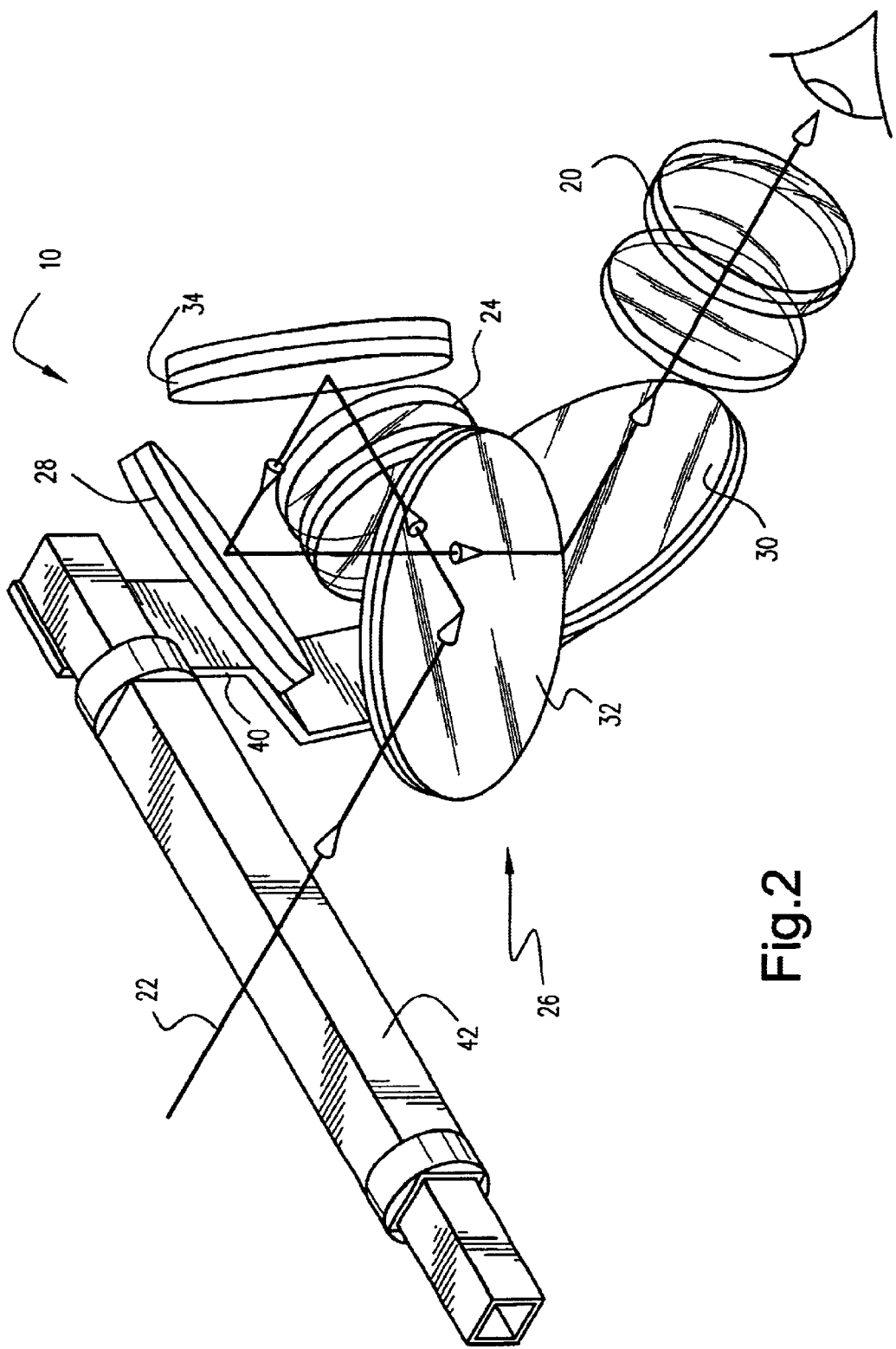
FIG. 2 is a perspective view showing an optical path defined by the lenses and mirrors of the system.

FIG. 2 shows a preferred arrangement of lenses and mirrors of the optical system 10 according to the invention that define an optical path 22. The system includes an objective lens 24 that may be placed anywhere along the optical path, the eyepiece lens 20 discussed above, and a mirror cluster 26 including first 28 and second 30 substantially planar mirrors that are disposed at an angle with respect to each other of substantially 90°. The system also includes a third mirror 32 that, in a preferred embodiment, reflects incoming light through the objective lens 24 toward a fourth mirror 34 that reflects the incoming light toward the first mirror 28 of the mirror cluster 26. The image is then reflected to the second mirror 30 of the mirror cluster 26 and through the eyepiece lens 20.

Figure 3:
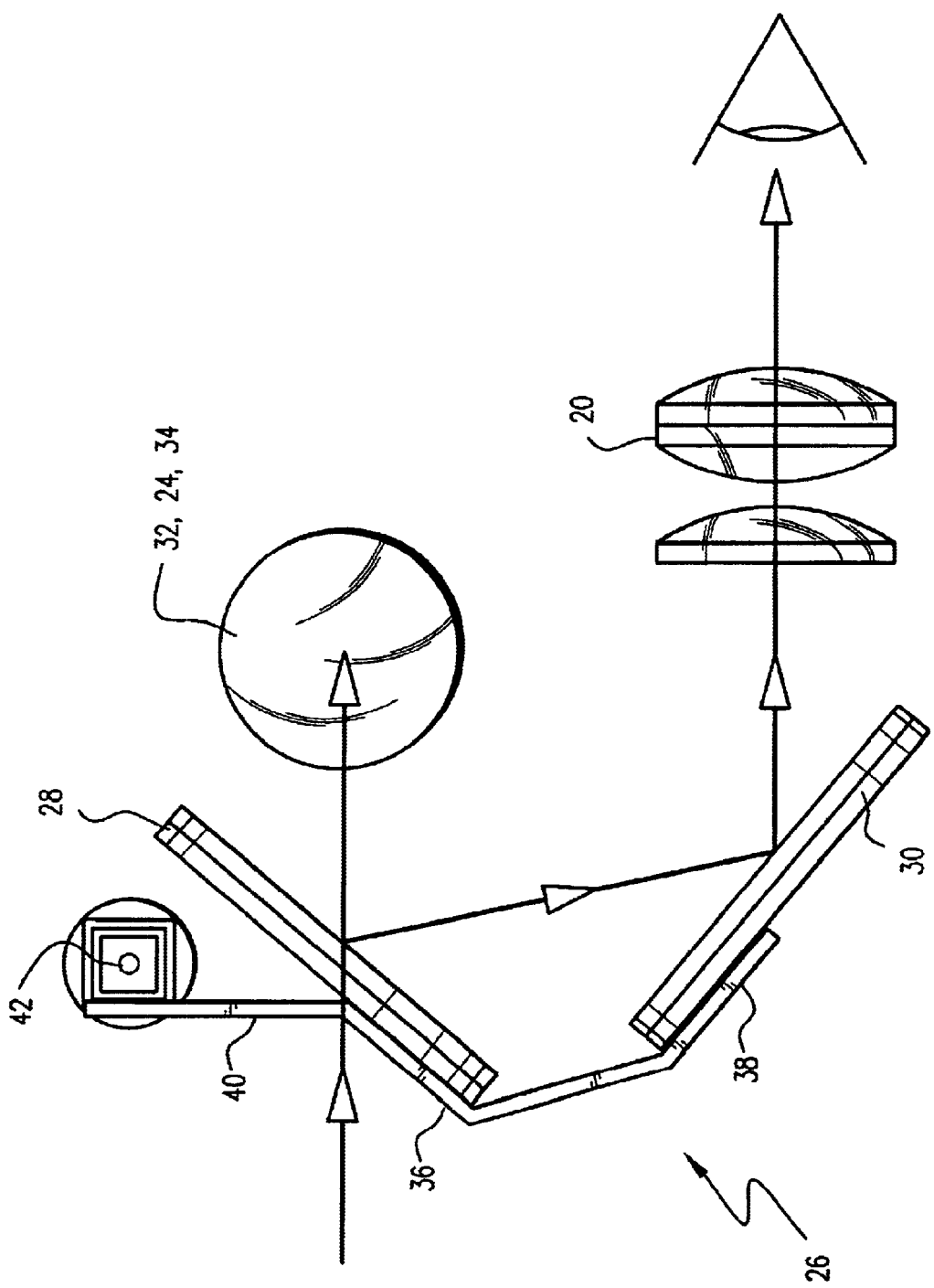
FIG. 3 is a simplified side view with the mirror cluster shown in position for far focus.
Figure 4:
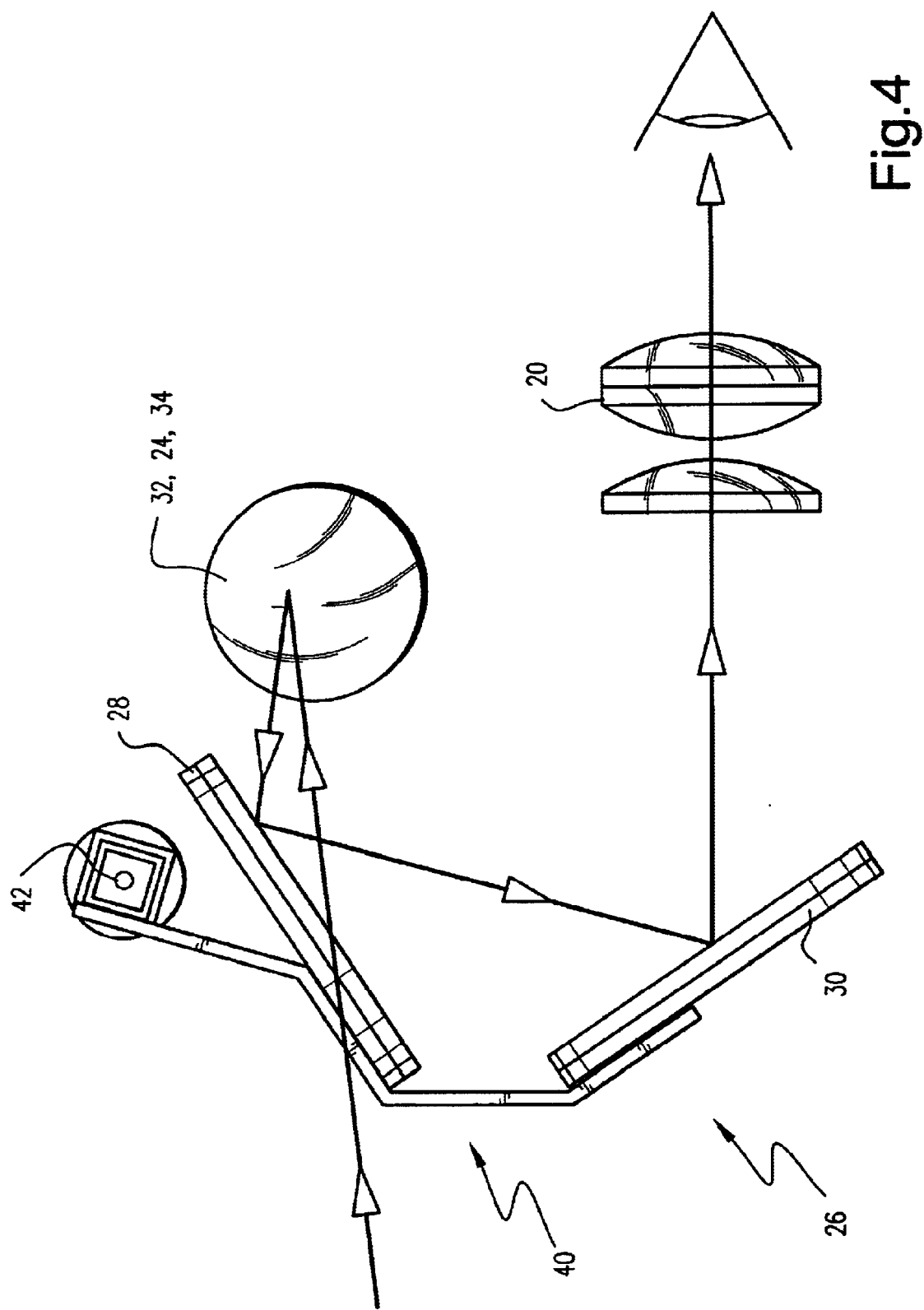
FIG. 4 is a simplified side view with the mirror cluster shown in position for near focus.

With continued reference to FIG. 2 and with reference to FIGS. 3 and 4, the first 28 and second 30 mirrors of the mirror cluster 26 are secured to respective arms 36, 38 of a bracket 40. The bracket 40 is coupled with a rotatable mirror arm 42 that effects controlled pivotal movement of the bracket 40 and thus the mirror cluster 26. It has been discovered that the linear movement of the mirror cluster described in the above-mentioned U.S. Pat. No. 6,065,835 can be eliminated to provide a more compact and lightweight system by pivoting the mirror cluster 26 for far focus and near focus applications. FIG. 3 shows an exemplary position of the mirror cluster 26 in position for far focus operation (for example, 3' or farther). When the system detects that a near focus operation is required, the mirror cluster 26 is pivoted to the position illustrated in FIG. 4 via rotation of the mirror arm 42. In this manner, focusing for near images (for example, 3' or less) can be accurately achieved. As shown in FIGS. 3 and 4, each mirror of the mirror cluster 26 is thus disposed in the optical path 22 regardless of a position of the mirror cluster 26, i.e., in the far focus position shown in FIG. 3 and the near focus position shown in FIG. 4.

Figure 5:
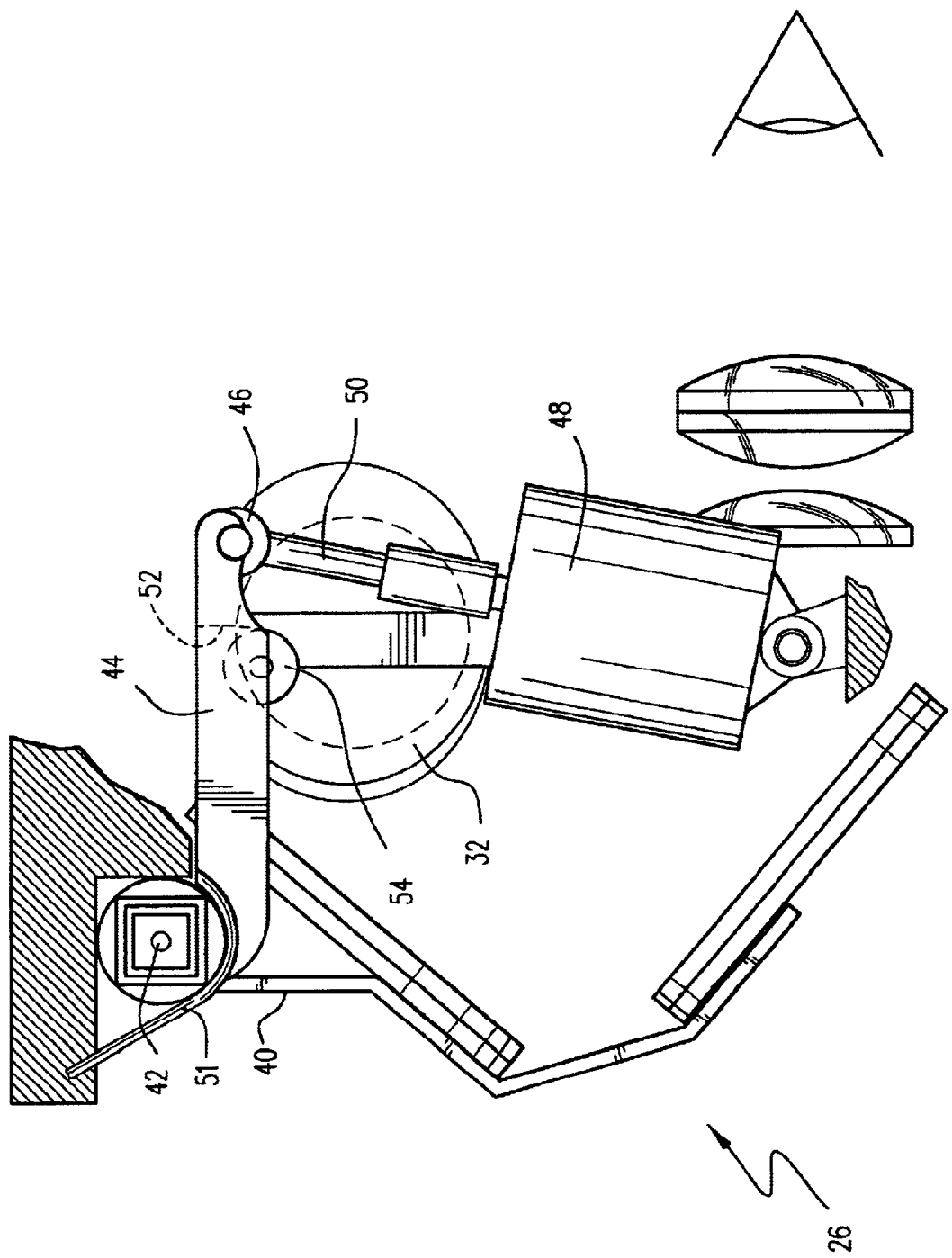
FIG. 5 is a side view of the mirror arm axle rotation system and convergence system.

With reference to FIG. 5, pivoting of the mirror cluster 26 via bracket 40 is accomplished by rotating the mirror arm 42 about its axis. The mirror arm is connected to one end of a lever arm 44, which in turn is connected at its other end to a trunion 46. The trunion 46 is coupled with a motor 48 via a lead screw 50. A torsion spring 51 holds the mirror arm 42 and associated parts against the frame and also applies a preload against the motor 48. As the motor 48 drives the trunion 46 forward and back via the lead screw 50, the lever arm 44 is pivoted thereby rotating the mirror arm 42, and thereby pivoting the bracket 40 and mirror cluster 26. Alternatively, the lever arm 44 can be pivoted manually.

A binocular system needs to ensure convergence of the image being viewed. When an object to be viewed is three feet or closer to the objective lens or lenses of a binocular system, unless some adjustment of the optical components is effected, it is not possible to maintain a fused binocular image. Convergence is provided according to the invention by mounting each third mirror 32 pivotally, for pivotal movement about a pivot axis relative to the objective lens 24. Preferably, structure is provided for automatically pivoting each third mirror 32 in response to a pivot position of the mirror cluster 26 to maintain a substantially constant optical relationship between the mirror cluster 26 and the third mirror 32 and to provide a fused binocular image for objects about 3' or less from the system.

In order to automatically pivot the third mirror 32 with pivoting of the mirror cluster 26, automatic pivoting structure is coupled with the lever arm 44. The automatic pivoting structure may include any conventional structure that effects pivotal movement of one component to which it is connected while allowing relative movement of that component with respect to another. In a preferred embodiment, with continued reference to FIG. 5, the automatic pivoting structure includes a cam surface 52 on the lever arm 44 and a cam follower 54 coupled with the third mirror 32. In the binocular arrangement, the third mirrors 32 and respective cam followers 54 are biased against the cam surfaces 52 via a spring connected between them. With this structure, as the motor 48 drives the lead screw 50 to pivot the lever arm 44 and rotate the mirror arm 42, the cam follower 54 rides on the cam surface 52 to adjust a position of the third mirror 32.

The vertical position of the point of view shifts along with focus to compensate for the vertical distance between the viewer's eye level and the incoming light path. This compensation can be understood as caused by the vertical displacement of a center ray due to the vertical shift of the vertex of the third 32 and fourth 34 mirrors from their rotational motion as a unit. The position of the mirror arm 42 axle center of rotation is chosen so as to cause the point of view to appear approximately as if it were directly in front of the eyes over the full range of focus from infinity to about 10". As the focus is shifted, the horizontal point of view is also moved so that both eyes perceive the same points on the object together (i.e., the left and right images "fuse"). This is effected by pivoting the third mirror 32 in coordination with the focus motion via the mirror cluster 26 as described above.

The pupillary distance (i.e., the distance between an individual's pupils) can be accommodated by allowing de-coupling of various components in the system of the invention, and reattachment once adjusted. An easy to adjust (but also easy to move out of adjustment) mechanism for this purpose such as found in conventional binoculars is not necessary because the system of the invention will not normally be used by more than one or a few people. Preferably, pupillary distance adjustment is effected by sliding the lens holder against the frame and the mirror arm in or out of the axle. An extension of the mirror arm may be provided to engage a surface on the lens holder so that the two parts move in unison.

To compensate for alignment errors caused by tolerances in production and assembly of components, the fourth mirror 34 is provided with an adjustment system including a kinematic arrangement that is typical of mirror mounts used in optical research labs. The mirror is bonded to a plate pre-loaded by a spring to bear against three screws. One pointed screw engages a hole in the plate, a second pointed screw engages a v-groove in the plate, and a rounded tip screw bears against a flat on the plate.

In addition to the horizontal and vertical alignment permitted by the aforementioned mirror mounting system, it may become necessary to provide for adjustment of scene angle between left and right sides if economical production of parts precludes sufficiently accurate deterministic mounting. There are several ways this might be done, with the choice to be determined if needed, such as by twisting the mirror arm 42 or incorporating another adjustment mechanism similar to and orthogonal to the above-mentioned kinematic mount.

Figure 6:
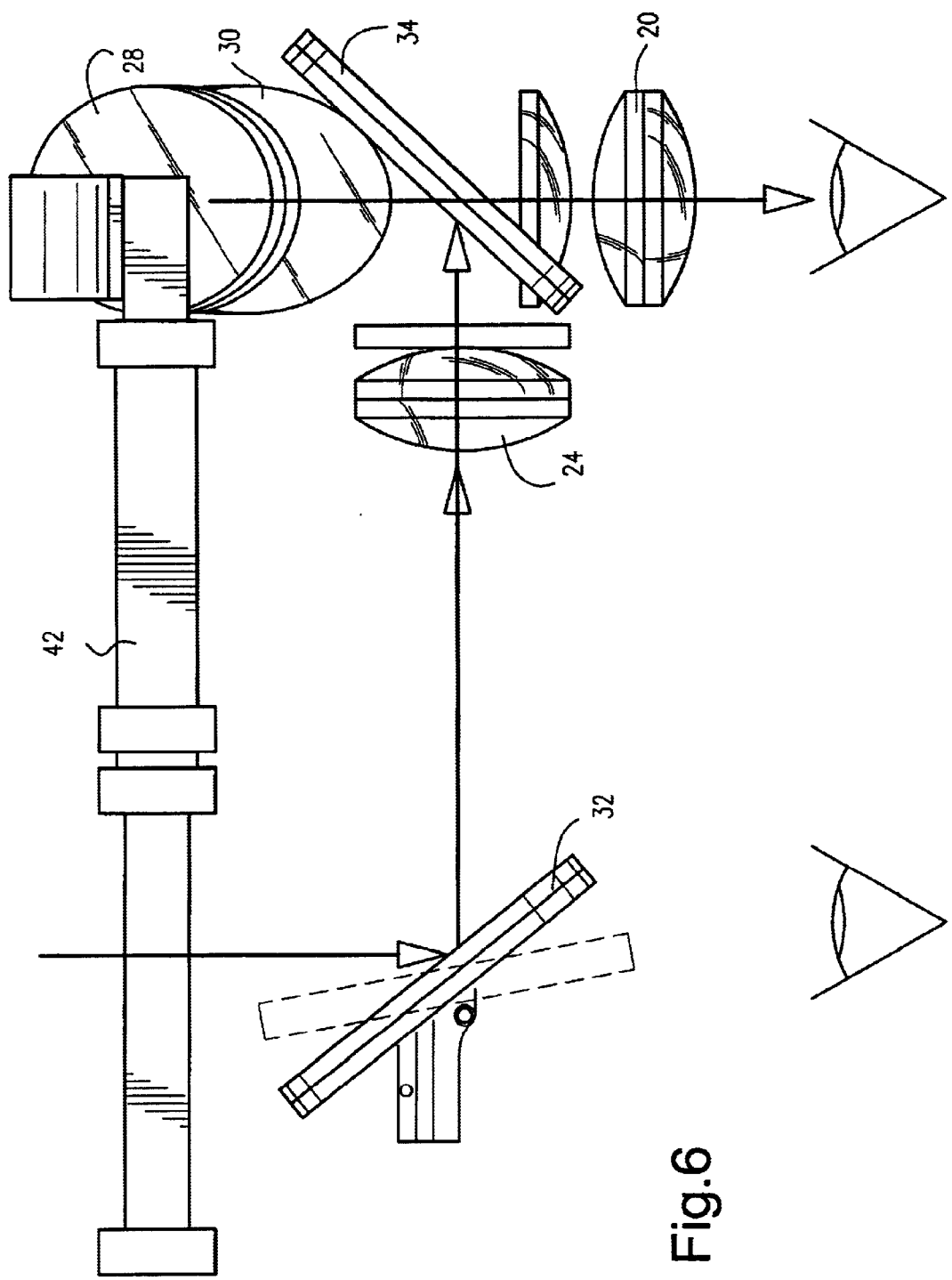
FIG. 6 illustrates a monocular version of the vision enhancing optical system according to the present invention.

In a monocular variant according to the present invention, in addition to simply using one-half of the device, the entrance mirror or third mirror 32 is positioned adjacent the user's eye opposite the ocular (that is, if the ocular is at the right eye, the entrance mirror will be on the side of the left eye). The preferred construction of the monocular variant according to the invention is illustrated in FIG. 6. In FIG. 6, the ocular is positioned adjacent the user's right eye, and the third mirror 32 is positioned adjacent the user's left eye. Otherwise, the system and components are the same as that for the binocular variant described above, and the components will not be described again. This construction allows for a much longer optical path than the binocular system, with the benefits attendant to the optical path.

Figure 7:
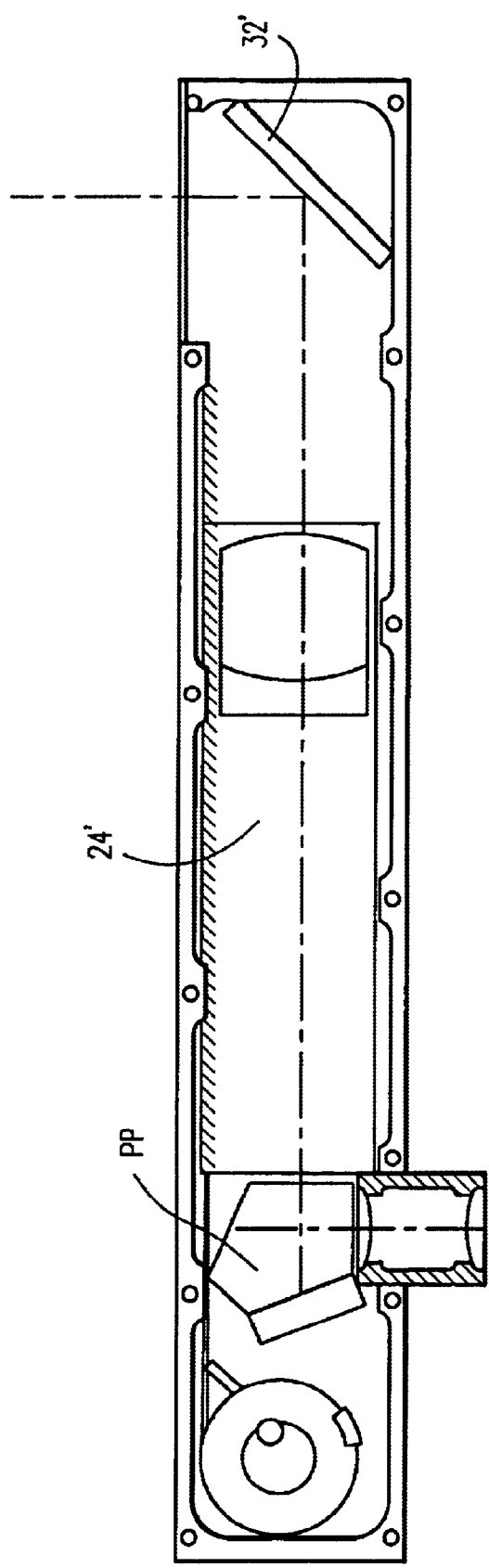
FIG. 7 shows an alternative embodiment of the invention, illustrating image position correction.

Still another variation is illustrated in FIG. 7. This embodiment incorporates the pivoting entrance mirror 32' in place of a prism in the vision enhancing system disclosed in U.S. Pat. No. 4,704,000, the disclosure of which is hereby incorporated by reference. That is, the Amici prism in the noted U.S. patent is replaced with a pivoting third mirror 32' of the present invention. The mirror 32' reflects incoming light to an objective 24' and reflects the image to the ocular via a penta prism PP. With this construction, the image space of an object can be brought into alignment with the ocular at close distance, instead of being in front of and perpendicular to the device at the entrance mirror.

It will thus be seen that according to the present invention a highly advantageous optical system has been provided that is readily mounted to conventional eyeglasses.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A vision enhancing optical system comprising:
an objective lens disposed in an optical path;
an eyepiece lens disposed in the optical path; and
a mirror cluster disposed in the optical path and comprising first and second substantially planar mirrors which are disposed at an angle of substantially 90° relative to each other, wherein said mirror cluster is pivotable about an axis substantially perpendicular to the optical path at said mirror cluster, and wherein each mirror of said mirror cluster is disposed in the optical path regardless of a position of said mirror cluster, said axis being positioned relative to said mirror cluster such that pivoting said mirror cluster about said axis alters a length of the optical path and thereby varies a focus of the vision enhancing optical system.

2. An optical system according to claim 1, further comprising a third mirror disposed in the optical path reflecting incoming light toward the objective lens.

3. An optical system according to claim 2, further comprising a fourth mirror disposed in the optical path reflecting the incoming light toward the mirror cluster.

4. An optical system according to claim 1, wherein disposed along the optical path in sequence are a third mirror reflecting incoming light toward the objective lens, the objective lens, a fourth mirror reflecting the incoming light toward the mirror cluster, the mirror cluster, and the eyepiece lens.

5. An optical system according to claim 1, wherein the first and second mirrors of the mirror cluster are coupled to arms of a bracket disposed substantially 90° relative to each other, wherein the bracket is coupled with a rotatable mirror arm.

6. An optical system according to claim 5, further comprising means for rotating the mirror arm.

7. An optical system according to claim 6, wherein the rotating means comprises a motor.

8. An optical system according to claim 6, further comprising a third mirror disposed in the optical path reflecting the incoming light toward the mirror cluster, wherein the third mirror is pivotable relative to the objective lens.

9. An optical system according to claim 8, wherein the mirror arm comprises a cam, and wherein the third mirror is coupled with a cam follower engaging the cam, a position of the third mirror being adjusted based on a position of the mirror arm.

10. An optical system according to claim 1, wherein the optical system is a monocular system.

11. An optical system according to claim 10, further comprising an entrance mirror that reflects incoming light toward the mirror cluster, wherein the entrance mirror is spaced from the mirror cluster by a distance substantially corresponding to a distance between a person's eyes.

12. An optical system according to claim 11, wherein the entrance mirror is pivotable relative to the optical path.

13. An optical system according to claim 1, wherein the optical system is a binocular system.

14. An optical system according to claim 1, further comprising an eyepiece that houses the eyepiece lens, wherein the optical system is attachable to a frame of a pair of glasses, and wherein when the optical system is attached to the glasses frame, only the eyepiece and eyepiece lens impinge an area inside the glasses frame.

15. A binocular vision enhancing optical system comprising:
first and second objective lenses disposed in first and second optical paths, respectively;
first and second eyepiece lenses disposed in the first and second optical paths, respectively; and
first and second mirror clusters disposed in the first and second optical paths, respectively, each of the first and second mirror clusters comprising first and second substantially planar mirrors which are disposed at an angle of substantially 90° relative to each other, wherein said mirror clusters are pivotable about an axis substantially perpendicular to the respective optical paths at said mirror clusters, and wherein each mirror of said mirror cluster is disposed in the optical path regardless of a position of said mirror cluster, said axis being positioned relative to said mirror cluster such that pivoting said mirror cluster about said axis alters a length of the optical path and thereby varies a focus of the vision enhancing optical system.

16. A vision enhancing optical system comprising:

a pair of glasses including a frame; and a vision enhancing unit secured to the glasses frame, the vision enhancing unit including:
an objective lens disposed in an optical path,
an eyepiece lens disposed in the optical path, and
a mirror cluster disposed in the optical path and comprising first and second substantially planar mirrors which are disposed at an angle of substantially 90° relative to each other, wherein said mirror cluster is pivotable about an axis substantially perpendicular to the optical path at said mirror cluster, and wherein each mirror of said mirror cluster is disposed in the optical path regardless of a position of said mirror cluster, said axis being positioned relative to said mirror cluster such that pivoting said mirror cluster about said axis alters a length of the optical path and thereby varies a focus of the vision enhancing optical system.

17. An optical system according to claim 16, further comprising an eyepiece that houses the eyepiece lens, wherein only the eyepiece and eyepiece lens impinge an area inside the glasses frame.

18. A vision enhancing optical system comprising:

a pair of glasses including a frame; and a vision enhancing unit secured to the glasses frame, the vision enhancing unit including:
an objective lens disposed in an optical path,
an eyepiece lens disposed in the optical path,
a pivotable entrance mirror reflecting incoming light toward the objective lens, and
a mirror cluster disposed in the optical path and including first and second mirrors disposed in a fixed relationship substantially perpendicular to each other, wherein said mirror cluster is pivotable about an axis substantially perpendicular to the optical path at said mirror cluster, and wherein each mirror of said mirror cluster is disposed in the optical path regardless of a position of said mirror cluster, said axis being positioned relative to said mirror cluster such that pivoting said mirror cluster about said axis alters a length of the optical path and thereby varies a focus of the vision enhancing unit.

19. A vision enhancing optical system according to claim 18, wherein the mirror cluster is pivotable about an axis substantially perpendicular to the optical path at the mirror cluster, and wherein the pivotable entrance mirror is coupled with the mirror cluster such that a pivot position of the entrance mirror is dependent upon a pivot position of the mirror cluster.

20. A vision enhancing optical system comprising:

an objective lens disposed in an optical path;

an eyepiece lens disposed in the optical path;

a mirror cluster disposed in the optical path and comprising first and second substantially planar mirrors coupled to arms of a bracket disposed substantially 90° relative to each other, wherein the bracket is coupled with a rotatable mirror arm that is pivotable about an axis substantially perpendicular to the optical path at said mirror cluster;

means for rotating the mirror arm; and a third mirror disposed in the optical path reflecting the incoming light toward the mirror cluster, wherein the third mirror is pivotable relative to the objective lens, wherein the mirror arm comprises a cam, and wherein the third mirror is coupled with a cam follower engaging the cam, a position of the third mirror being adjusted based on a position of the mirror arm.

21. A vision enhancing optical system comprising:

a pair of glasses including a frame; and a vision enhancing unit secured to the glasses frame, the vision enhancing unit including:
an objective lens disposed in an optical path,
an eyepiece lens disposed in the optical path,
a pivotable entrance mirror reflecting incoming light toward the objective lens, and
a mirror cluster disposed in the optical path and including first and second mirrors disposed in a fixed relationship substantially perpendicular to each other, wherein the mirror cluster is pivotable about an axis substantially perpendicular to the optical path at the mirror cluster, and wherein the pivotable entrance mirror is coupled with the mirror cluster such that a pivot position of the entrance mirror is dependent upon a pivot position of the mirror cluster.

* * * * *